United States Patent [19]
Cheng

[11] Patent Number: 6,138,197
[45] Date of Patent: Oct. 24, 2000

[54] APPARATUS AND METHOD FOR LIMIT-BASED ARBITRATION SCHEME

[75] Inventor: Linda Cheng, San Jose, Calif.

[73] Assignee: Sun Microsystems, Inc., Palo Alto, Calif.

[21] Appl. No.: 09/154,500

[22] Filed: Sep. 17, 1998

[51] Int. Cl.[7] .................................................. G06F 13/14
[52] U.S. Cl. ............................ 710/117; 710/45; 710/241
[58] Field of Search ....................... 710/40–45, 107–125, 710/240–244

[56] References Cited

U.S. PATENT DOCUMENTS

| | | | |
|---|---|---|---|
| 5,239,631 | 8/1993 | Boury et al. ............................. | 710/117 |
| 5,241,632 | 8/1993 | O'Connell et al. . | |
| 5,377,332 | 12/1994 | Entwistle et al. . | |
| 5,560,019 | 9/1996 | Fiebrich et al. ........................ | 710/240 |
| 5,809,278 | 9/1998 | Watanabe et al. ..................... | 711/150 |
| 5,845,097 | 12/1998 | Kang et al. ............................. | 710/117 |
| 5,907,689 | 5/1999 | Tavallaei et al. ....................... | 710/110 |
| 5,996,037 | 11/1999 | Emnett .................................... | 710/117 |

*Primary Examiner*—Paul R. Myers
*Attorney, Agent, or Firm*—Finnegan, Henderson, Farabow, Garrett & Dunner, L.L.P.

[57] ABSTRACT

An arbiter implements an arbitration scheme that allows a requestor that has been granted use of a resource to use the resource for a predetermined number of data transfers before relinquishing the resource. At the time a requestor is granted use of the resource, a register is loaded with a value that defines a limit on the how much the requestor can use the resource. More particularly, the value defines a number of bytes that the requester is allowed to transfer before being required to relinquish use of the resource. The value is decremented each time the requestor makes a data transfer, as long as there is also a pending request from another requestor. If there is no pending request from another requester, the value is not decremented even though the requestor has transferred data. Until the time that the value is decremented to zero, the requester may repeatedly make requests to the arbiter for use of the resource, and the arbiter will continue to grant them. Upon the value becoming zero, however, the arbiter reverts to its original state of handling incoming requests for the resource.

24 Claims, 4 Drawing Sheets

APPARATUS AND METHOD FOR LIMIT-BASED ARBITRATION SCHEME

BACKGROUND OF THE INVENTION

A. Field of the Invention

Apparatus and methods consistent with the invention relate generally to arbitration and, in particular, to apparatus and methods for providing limit-based arbitration.

B. Description of the Prior Art

Network interface cards are used to transfer data between a network and a device. The network interface card has dedicated receive circuitry and transmit circuitry for handling the transfers. If the receive circuitry and transmit circuitry compete for the same resource, then a arbiter is used to determine which circuitry gains access to the resource.

A conventional network interface card interconnects a network and a bus, such as an internal bus of a device. The network interface card includes a bus controller, which receives requests for access to the bus and grants the requests for the bus; receive circuitry, which receives information from network; transmit circuitry, which transmits data to the network; and an arbiter, which coordinates requests and grants between the bus controller, transmit circuitry, and receive circuitry.

The transmit circuitry and receive circuitry each send requests to the arbiter when they need to access the bus. The arbiter receives the requests and determines which of the transmit circuitry or receive circuitry will be granted access to the bus. In conventional systems, if no transfers are taking place at the time a request is made, and there is only one requestor, that requestor will be granted use of the bus by the arbiter. If the transmit circuitry and receive circuitry make a request substantially simultaneously, the arbiter must determine which of the transmit circuitry or receive circuitry will be granted access.

In conventional systems, the arbiter often uses a round robin arbitration scheme to resolve requests. In a round robin arbitration scheme, the grant goes to the requester that did not receive the grant in the previous round of arbitration. This system works well for many types of data transfers, but frequently creates unfairness in the system. For example, if the transmit circuitry is transferring large units of data between the bus and the network, and the receive circuitry is transferring small units of data, then the transmit circuitry will dominate use of the bus. The transmit circuitry will control the bus for a long time during a transfer, the receive circuitry will control for a short time, then the transmit circuitry will again control for a long time. Thus, the transmit circuitry will occupy the bus a disproportionate amount of time.

This may be acceptable if the receive circuitry does not have many data transfers. But if the quantity of data coming into the receive circuitry from the network is large, the receive circuitry will start dropping incoming data. Many systems suffer from this limitation because the receive circuitry in network interface cards often has limited receive buffer capacity. Thus, conventional systems do not provide optimum fairness among requestors in many situations.

The round robin arbitration scheme also treats both requestors equally at the time of arbitration. Due to limited on-chip receive buffer capacity and relatively unlimited transmit capacity in host memory, it is desirable to weight receive traffic greater then transmit traffic. Preemption has been used in the past to preempt transmit traffic and make way for receiving traffic. Preemption, however, opens up the possibility for unlimited starvation of transmit traffic if receive is active. What is needed, then, is a method and system that provides fairness in a manner that cures the above problems.

SUMMARY OF THE INVENTION

Methods and systems consistent with the present invention provide an improved arbitration scheme that imposes weighted fairness among requesters to a resource. In accordance with this arbitration scheme, an arbiter receives requests to use a resource, grants use of the resource, and allows a requestor which has received a grant to continue using a resource for a predetermined number of data transfers irrespective of other requests. In this way, the improve arbitration scheme imposes fairness among the requestors to reduce the likelihood that a particular requestor dominates use of a resource. In one embodiment, the limit is only imposed when there is a pending request from another requestor. In another embodiment, the limit is only imposed when the requestor which was granted access actually makes a transfer. The two embodiments may be combined so that the limit is imposed when there is a pending request and a transfer is made.

An apparatus consistent with the improved arbitration scheme includes a limit value store that stores a value which limits the number of data transfers a requestor can transfer across a resource. A method consistent with the improved arbitration scheme includes storing a limit value which is used to limit the number of data transfers for which a requestor can access a resource.

Additional objects and advantages of the invention will be set forth in part in the description which follows, and in part will be clear from the description, or may be learned by practice of the invention. The objects and advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate an embodiment of the invention and, together with the description, serve to explain the principles of the invention.

DETAILED DESCRIPTION OF THE PREFERRED EMBODIMENTS

Reference will now be made in detail to the present preferred embodiment of the invention, an example of which is illustrated in the accompanying drawings. The apparatus and method disclosed herein and consistent with the invention arbitrates between two requestors competing for access to a shared resource, and sets limits on the extent to which each requestor can utilize the shared resource. More particularly, the invention arbitrates between receiving and transmitting requestors by imposing limits on the extent to which a transmit or receive requester can use the resource before allowing the other to use the resource. The limits are imposed by a receive limit register and transmit limit register. The limit registers ensure that each requestor is only allocated a particular level of resource use before being required to give up the resource for use by the other requestor. In one embodiment, the limit is only imposed if certain conditions are met. For example, the limit may be imposed only if there is a pending request from another requestor, or if a transfer for the requestor that was granted access actually takes place. In another embodiment, the limit is imposed if there is a pending request and a transfer actually takes place.

Figure 1:
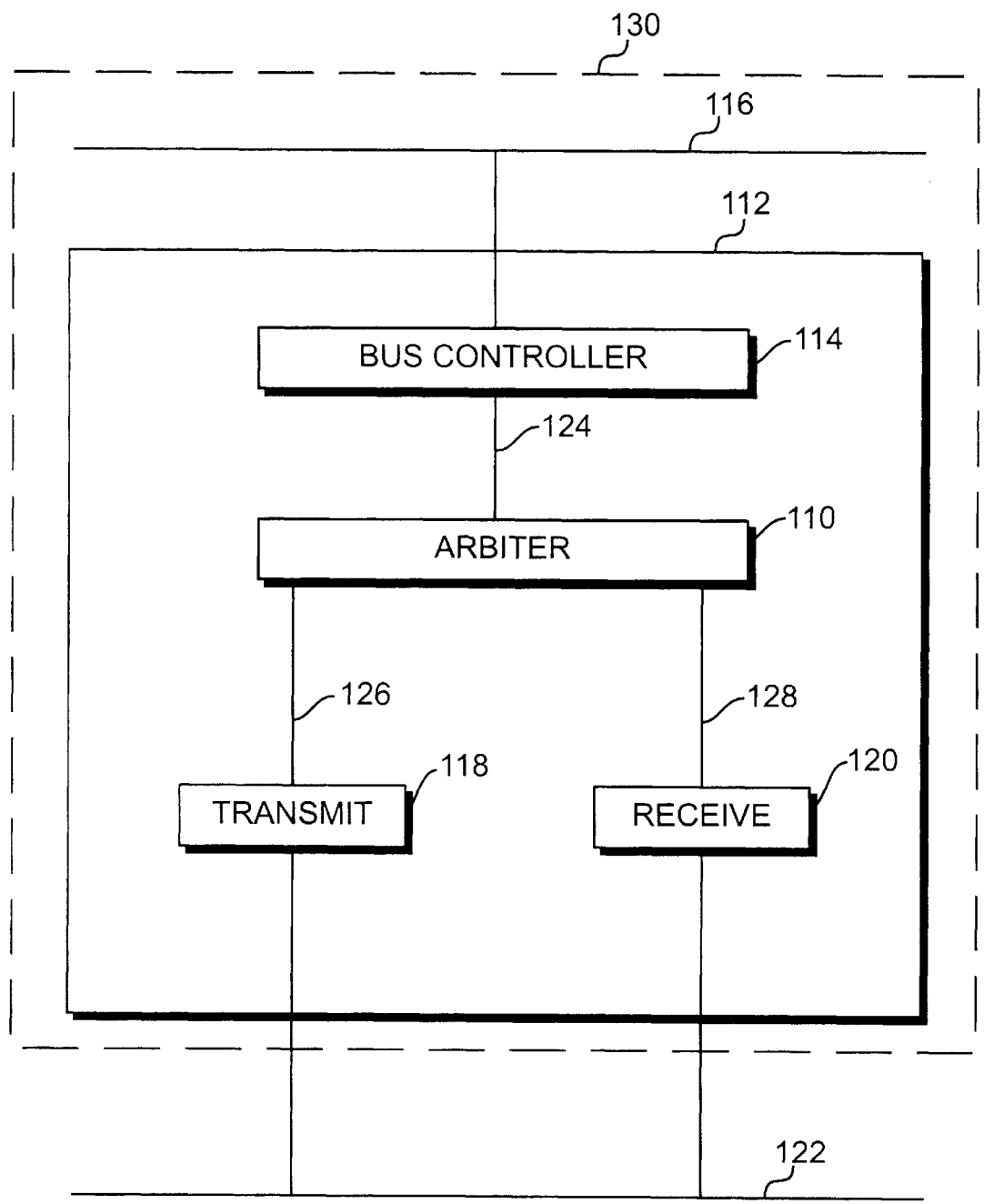
FIG. 1 is a block diagram showing a conventional network interface card 112.

FIG. 1 depicts a conventional network interface card 112 connected between a communication media 122, such as a network, and a bus 116. Bus 116 may be an internal bus of a device. Network interface card 112 and bus 116 may be internal to a device 130, indicated in FIG. 1 by a broken line. Network interface card 112 includes a bus controller 114, which receives requests for bus 116 from arbiter 110 over lines 124, and grants the requests for bus 116 using the same lines; receive circuitry 120, which receives information from network 122; transmit circuitry 118, which transmits data to network 122; and arbiter 110, which coordinates requests and grants between bus controller 114, transmit circuitry 118 and receive circuitry 120.

Transmit circuitry 18 and receive circuitry 120 send requests to arbiter 110 via lines 126 and 128, respectively, when they need to use bus 116. Arbiter 110 receives the requests and determines which of transmit circuitry 118 or receive circuitry 120 will be granted use of bus 116. As in conventional systems, if no transfers are taking place at the time a request is made, and there is only one requester, that requestor will be granted use of bus 116 by arbiter 110. If transmit circuitry 118 and receive circuitry 120 make a request substantially simultaneously, arbiter 110 must determine which of transmit circuitry 118 or receive circuitry 120 will be granted their request.

Figure 2:
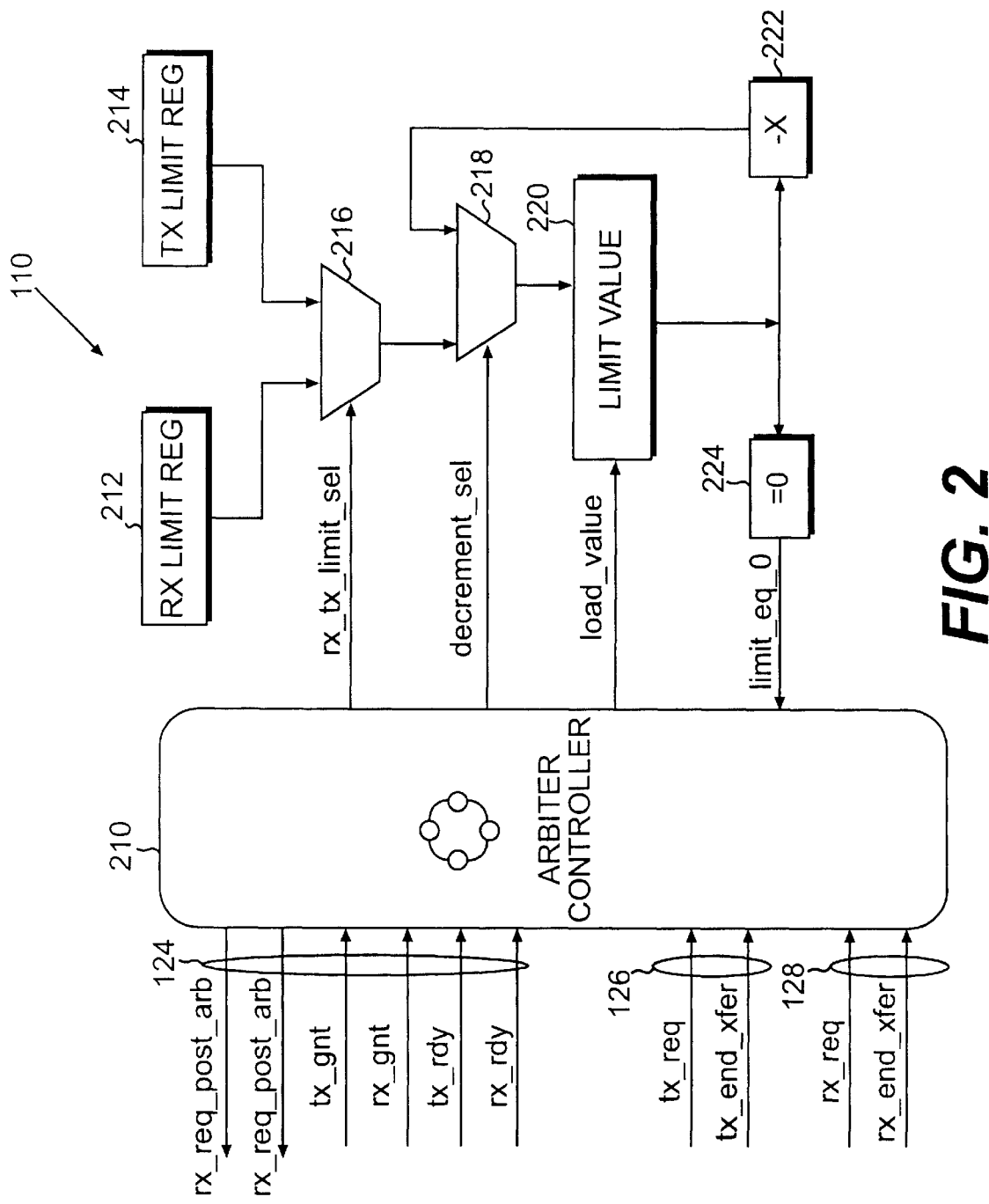
FIG. 2 is a block diagram showing an arbiter consistent with the principles of the improved arbitration scheme.

FIG. 2 is a block diagram illustrating arbiter 110 in accordance with methods and systems consistent with the present invention. The arbiter is comprised of arbiter controller 210, Rx limit register 212, Tx limit register 214, limit multiplexer 216, value multiplexer 218, limit value store 220, decrementer 222, and zero detector 224.

There are four types of signal lines handled by arbiter controller 210. Lines 124 are connected to bus controller 114, lines 126 are connected to transmit circuitry 118, and lines 125 are connected to receive circuitry 120. A "xx_req" line (wherein "xx" may be either "rx" or "U.") is used to request control of the resource. The signal is sent to arbiter controller 210 by either transmit circuitry 118 (tx_req) or receive circuitry 120 (rx_req) (as shown in FIG. 1).

An "xx_req_post_arb" signal is sent by arbiter controller 210 to bus controller 114 after choosing a winner of an arbitration. If transmit circuitry 118 wins, then arbiter controller 210 sends tx_req_post_arb, and if receive circuitry 120 wins then arbiter controller 210 sends rx_req_post_arb.

An "xx_gnt" signal is sent by bus controller 114 to arbiter controller 210, and passed on to the circuitry the signal is intended for. The signal means that the request is granted by bus controller 114. For example, if bus controller 114 sends a tx_gnt to arbiter controller 210, the signal is forwarded (not shown) to transmit circuitry 118. Similarly, if bus controller 114 sends a rx_gnt to arbiter controller 210, the signal is forwarded (not shown) to receive circuitry 120.

Thus, the xx_req, xx_req_post_arb, and xx_gnt signals are used for requesting the resource, and granting access to the resource. Two other signals, xx_rdy and xx_end_xfer, are used to manage the transfer after the grant has been made. xx_rdy is sent by bus controller 114 to arbiter controller 210, which forwards the signal (not shown) to the appropriate transmit circuitry 118 or receive circuitry 120. xx_rdy is sent by bus controller 114, and indicates that bus controller 114 is capturing data from the requestor in a write access or transferring data to the requestor in a read access. The signal is only valid when the corresponding xx_gnt signal is high.

The xx_end_transfer signal is a pulse marker sent by either transmit circuitry 118 (tx_end_transfer) or receive circuitry 120 (rx_end_transfer) to arbiter controller 210, that indicates that the data transfer started by the original request has ended. Arbiter controller 210 forwards the signal (not shown) to bus controller 114 to signal to bus controller 114 that the data transfer is complete.

Arbiter controller 210 initially operates in a conventional fashion by granting requests to either the receive or transmit circuitry, and uses a round robin scheme when the requests are received substantially simultaneously. In accordance with the principles of the improved arbitration scheme, however, if a request is received from one requester during the time another requester is using bus 116, limit registers 212 and 214 are used to ensure that the requester currently using bus 116 relinquishes control in a predetermined amount of time. How limit registers 212 and 214 allocate use of the resource will now be explained in greater detail.

When either the receive or transmit circuitry is granted use of bus 116, arbiter controller 210 sends rx_tx_limit_sel signal to limit select multiplexer 216 to selectively transfer the Rx limit register 212 or Tx limit register 214, corresponding to the circuitry that has been granted access, to limit multiplexer 216. At the same time, arbiter controller 210 sends a decrement_sel signal to value multiplexer 218 to selectively pass through the selected limit to limit value store 220. The load_value signal is also sent by arbiter controller 210 to load limit value store 220 at this time. After limit value store 220 has been loaded with the limit value of the requestor that was granted access, during each cycle in which there is a data transfer for the requestor currently controlling the bus, and there is a pending request from another requester, the value stored in limit value store 220 is altered and loaded back into limit value store 220 via value multiplexer 218. In a preferred embodiment, decrementer 222 decrements the value by a value x. For example, if the limit represents cycles, the value may be decremented by 1. If the limit represents bytes transferred, the value will be decremented by the number of bytes transferred.

Zero detector 224 monitors the value of limit value store 220, and sends a limit_eq_0 signal to arbiter controller 210 upon detecting that the value has been decremented to zero. Upon reaching zero, the requestor relinquishes control of bus 116. Prior to this time, the requester may continue to request bus 116, and each request will be granted. Thus, the requestor which has been granted access to bus 116 can continue to use bus 116 until another request is made, and thereafter only for a limited period of time as defined by its limit value.

Figure 3:
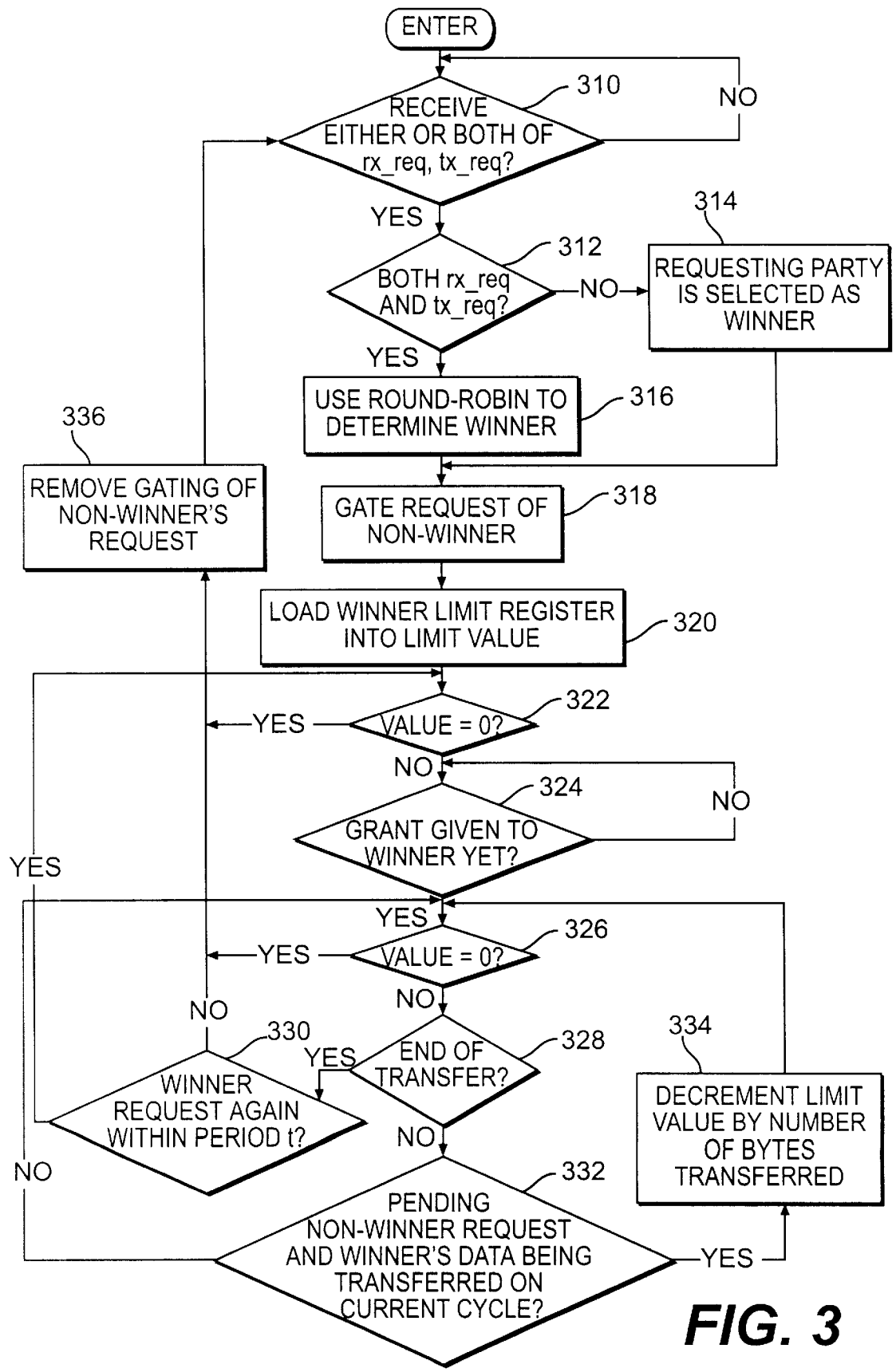
FIG. 3 is a flowchart showing the process performed by arbiter 110 of FIG. 2.

FIG. 3 is a flow chart illustrating the process performed by arbiter controller 210. Arbiter controller 210 initially waits for a request from either or both of the transmit and receive circuitry (step 310). If a request is received from both the request and the transmit circuitry (step 312), a round robin algorithm is used to determine the winner (step 316). After arbiter controller 210 determines a winner, the request of the non-winner is gated (step 318). Gating the request means that the request signal of the non-winner is not allowed to pass through to bus controller 114.

If the requests are not received simultaneously, the requesting circuitry is selected as the winner (step 314), and arbiter controller 210 proceeds to step 318 to gate the request of the non-winner. The process continues with initializing the limit value store 220 to the value of either Rx limit register 212 or Tx limit register 214 in accordance with the selected winner (step 320). If limit value store 220 is not equal to zero (step 322), arbiter controller 210 determines whether the grant has been given to the winner of the arbitration process yet (step 324). Once arbiter controller 210 gives the winner the grant, it then determines whether the value in limit value store 220 has reached zero (step 326). If the limit value store 220 has reached zero in step 326, the process removes gating of the non-winner's request (step 336), and returns to waiting for request at step 310.

If the value in limit value store 220 has not reached zero at step 326, arbiter controller 210 then determines whether the end of the transfer has been reached (step 328). If the end of the transfer has been reached, arbiter controller 210 determines whether the winner is requesting the resource again within a predetermined period of time, Δt (step 330). The time period may be, for example, a predetermined number of cycles. The time period limit is imposed to ensure that the winner does not tie up the resource, which could otherwise be used by the other requesters. If the winner is not requesting the resource again (step 330), then arbiter controller 210 removes gating of the non-winner's request (step 336), and processing continues at step 310.

If the winner is requesting the resource again, processing continues at step 322, checking whether limit value store 220 has reached zero. This allows the requestor having access to bus 116 to continue requesting, and being granted, use of bus 116 until limit value store 220 reaches zero.

If it is not the end of the transfer, arbiter controller 210 determines whether there is a pending non-winner request and whether the winner's data is being transferred during the current cycle (step 332). These two conditions are directed toward achieving different aims of the fairness of the improved arbitration scheme. The first condition, determining whether there is a pending non-winner request, allows a requestor to continue using bus 116, without having its value in limit value store 220 decremented, until the non-winner asserts a request. This imposes a limit on the number of transfers the requestor can make, but only when the non-winner is actually waiting.

The second condition, determining whether the winner's data is being transferred during the current cycle, ensures that the value in limit value store 220 is only decremented when a data transfer for the winner actually occurs. Thus, the value in limit value store 220 will not be decremented upon every cycle. This prevents penalizing the winner for cycles or times in the transaction which are not of benefit to the winner.

Thus, the value in limit value store 220 is decremented by decrementer 222 by the number of bytes transferred in the current cycle (step 334) only if both of these conditions are met. Arbiter controller 210 then continues processing at step 326.

If either of the conditions are not met, arbiter controller 210 continues processing at step 326. Thus, the values stored in Rx limit reg 212 and Tx limit reg 214 ensure that receive circuitry 120 and transmit circuitry 118 are each guaranteed a minimum number of transfers before arbiter controller 210 removes the grant to the requestor. The respective values stored in limit registers 212 and 214 can be selected to provide an optimum level of fairness between the transmit circuitry 118 and receive circuitry 120. The optimum level of fairness depends on many factors, such as the size and frequency of data received and transmitted. Imposing fairness prevents one of the receive or transmit processes from dominating bus 116.

Figure 4:
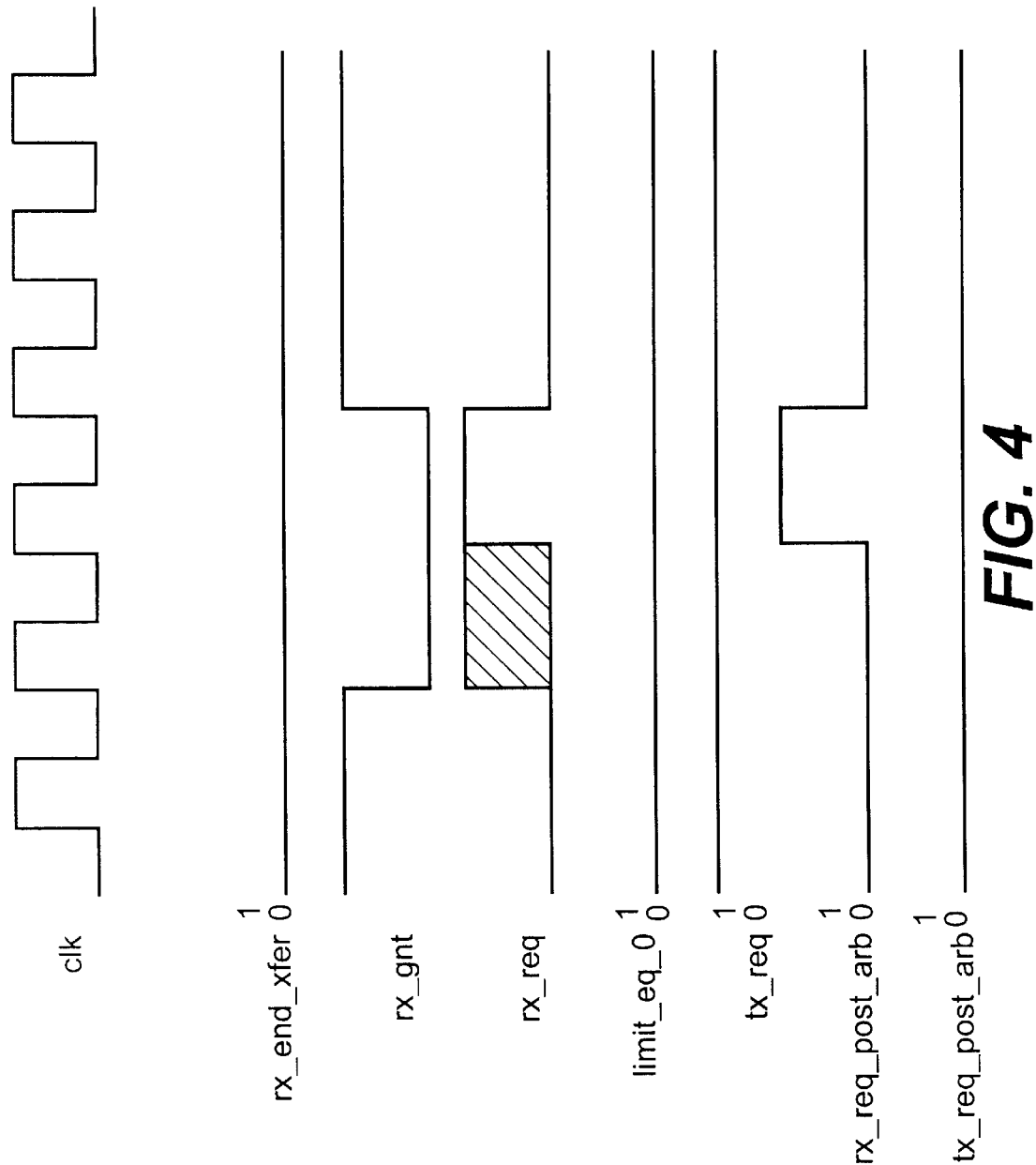
FIG. 4 is a timing diagram illustrating the sequence of operations performed by arbiter 110 of FIG. 2.

FIG. 4 is a timing diagram showing timing details of the request and grant process using the arbitration scheme in accordance with the principles of the improved arbitration scheme. More particularly, FIG. 4 illustrates the timing of signals when one requestor has control, and because the value in limit value store 220, corresponding to the winning requestor, has not reached zero, the requestor is allowed to finish a transfer, request again within a predetermined period of time Δt, and be granted the request even though the other requestor has a pending request.

At the beginning of the timing diagram, receive circuitry 120 has already been granted control (rx_gnt high). Transmit circuitry 118 is sending a request (tx_req high), but is not granted the request because limit value store 220 (which contains the value for receive circuitry 120), has not reached zero (limit_eq_0 low). And because the limit in limit value store 220 has not reached zero, when receive circuitry 120 sends a request (rx_req high), it is granted (rx_req_post_arb goes high, then rx_grant goes high) even though there is a pending tx_req from transmit circuitry 118. The tx_req is gated, so tx_req_post_arb stays low. Thus, the winning requestor is allowed to continue requesting the resource for a predetermined number of transfers even though there is a pending request from the non-winner requester.

It will be apparent to those skilled in the art that various modifications and variations can be made in the present invention and in construction of this arbiter without departing from the scope or spirit of the invention. For example, the invention may be used with more than two requesters. Implementing the invention with more than two requestors would merely require modifying the apparatus and method to include a limit register for each requestor, and circuitry for selectively decrementing the value of each limit register. An apparatus and method consistent with the invention could also be implemented using a limit value that represents something other than the number of bytes transferred. For example, the apparatus and method could be implemented using an arbitrary measure, such as cycles of data transferred or amount of time lapsed in the transaction.

CONCLUSION

Other embodiments of the invention will be apparent to those skilled in the art from consideration of the specification and practice of the disclosed embodiments. The specification and examples are exemplary only, and the true scope and spirit of the invention is defined by the following claims and their equivalents.

I claim:

1. An apparatus for arbitrating between requestors, comprising:

means for granting use of a resource to a first requestor based on a request from the first requestor;

means for setting a first limit value representing an allotment resource use to the first requestor in response to granting use of the resource to the first requester;

means for altering the first limit value in accordance with use of the resource only if there is a pending request from a second requestor; and means for granting multiple requests for the resource by the first requestor until the first limit value reaches a predetermined threshold.

2. The apparatus according to claim 1, further comprising:

means for selectively loading either the first limit value associated with the first requestor or a second limit value associated with a second requestor.

3. The apparatus according to claim 1, further comprising:

means for determining that the first limit value has reached the predetermined threshold.

4. The apparatus according to claim 1, wherein the means for altering further comprises:

means for altering the first limit value only if data is transferred for the first requestor.

5. The apparatus according to claim 1, wherein the means for altering comprises:

means for altering the first limit value only if data is transferred for the first requestor.

6. The apparatus according to claim 1, wherein the allotment of resource use is a number of bytes.

7. The apparatus according to claim 1, further comprising:

means for storing a selected limit value;

means for storing the first limit value;

means for storing a second limit value; and means for selectively transferring the first limit value or second limit value to the means for storing a selected limit value.

8. The apparatus according to claim 1, further comprising:

means for blocking requests from a second requestor during the time the first limit value has not reached a predetermined threshold.

9. A method for arbitrating between requesters, comprising:

granting use of a resource to a first requestor based on a request from the first requestor;

setting a first limit value representing an allotment of resource use to the first requestor in response to granting use of the resource to the first requester;

altering the first limit value in accordance with use of the resource only if there is a pending request from a second requestor; and granting multiple requests for the resource by the first requestor until the first limit value reaches a predetermined threshold.

10. The method according to claim 9, further including:

selectively loading either the first limit value associated with the first requester or a second limit value associated with a second requester.

11. The method according to claim 9, further including:

determining that the first limit value has reached the predetermined threshold.

12. The method according to claim 9, wherein the step of altering further includes: altering the first limit value only if data is transferred for the first requestor.

13. The method according to claim 9, wherein the step of altering includes: altering the first limit value only if data is transferred for the first requestor.

14. The method according to claim 9, wherein the allotment of resource use is a number of bytes.

15. The method according to claim 9, further including:

storing a selected limit value;

storing the first limit value;

storing a second limit value; and selectively transferring the first limit value or second limit value to a means for storing a selected limit value.

16. The method according to claim 9, further including:

blocking requests from a second requestor during the time the first limit value has not reached a predetermined threshold.

17. An apparatus for arbitrating between requesters, comprising:

a device for granting use of a resource to a first requestor based on a request from the first requester;

a device for setting a first limit value representing an allotment of resource use to the first requestor in response to granting use of the resource to the first requestor;

a device for altering the first limit value in accordance with use of the resource only if there is a pending request from a second requestor; and a device for granting multiple requests for the resource by the first requestor until the first limit value reaches a predetermined threshold.

18. The apparatus according to claim 17, further comprising:

a device for selectively loading either the first limit value associated with the first requestor or a second limit value associated with a second requestor.

19. The apparatus according to claim 17, further comprising:

a device for determining that the first limit value has reached the predetermined threshold.

20. The apparatus according to claim 17, wherein the device for altering further comprises:

a device for altering the first limit value only if data is transferred for the first requestor.

21. The apparatus according to claim 17, wherein the device for altering comprise:

a device for altering the first limit value only if data is transferred for the first requester.

22. The apparatus according to claim 17, wherein the allotment of resource use is a number of bytes.

23. The apparatus according to claim 17, further comprising:

a device for storing a selected limit value;

a device for storing the first limit value;

a device for storing a second limit value; and a device for selectively transferring the first limit value or second limit value to the device for storing a selected limit value.

24. The apparatus according to claim 17, further comprising:

a device for blocking requests from a second requestor during the time the first limit value has not reached a predetermined threshold.

* * * * *

UNITED STATES PATENT AND TRADEMARK OFFICE
CERTIFICATE OF CORRECTION

PATENT NO. : 6,138,197

DATED : October 24, 2000

INVENTORS : Linda Cheng

It is hereby certified that errors appear in the above-identified patent and that said Letters Patent is hereby corrected as shown below:

On the Title Page, Item [57], in the Abstract, line 6, after "limit on", delete "the";
    line 8, "requester" should read --requestor--;
    line 13, "requester" should read --requestor--; and
    line 15, "requester" should read --requestor--.

In Claim 1, col. 6, line 67, "requester" should read --requestor--.

In Claim 9, col. 7, line 37, "requesters" should read --requestors--.

In Claim 9, col. 7, line 43, "requester" should read --requestor--.

In Claim 10, col. 7, line 53, "requester" should read --requestor--.

In Claim 10, col. 7, line 54, "requester" should read --requestor--.

In Claim 17, col. 8, line 14, "requesters" should read --requestors--.

In Claim 17, col. 8, line 17, "requester" should read --requestor--.

UNITED STATES PATENT AND TRADEMARK OFFICE
CERTIFICATE OF CORRECTION

PATENT NO. : 6,138,197
DATED : October 24, 2000
INVENTOR(S) : Linda Cheng

It is certified that error appears in the above-identified patent and that said Letters Patent is hereby corrected as shown below:

Claim 21, col. 8, line 43, "comprise" should read --comprises--.

Claim 21, col. 8, line 45, "requester" should read --requestor--.

Signed and Sealed this

Fifteenth Day of May, 2001

Attest:

NICHOLAS P. GODICI

Attesting Officer    Acting Director of the United States Patent and Trademark Office